United States Patent [19]
Bergling

[11] 3,861,344
[45] Jan. 21, 1975

[54] METHOD AND MEANS FOR PREVENTING WEAR BETWEEN OUTER RING AND BEARING SEAT OF ROLLER BEARING IN THE STERN-POST OF SHIPS

[75] Inventor: Folke Gunnar Bergling, Partille, Sweden

[73] Assignee: SKF Industrial Trading and Development Company, B.V., Jutphass, Netherlands

[22] Filed: May 16, 1973

[21] Appl. No.: 360,901

[30] Foreign Application Priority Data
May 25, 1972  Sweden.............................. 6868/72

[52] U.S. Cl. ............................................. 114/169
[51] Int. Cl. ............................................. B63h 25/34
[58] Field of Search .......... 115/0.5 R, 34 R; 114/57, 114/169; 308/207 A, 207 R

[56] References Cited
UNITED STATES PATENTS

3,470,843  10/1969  Satterthwaite et al. ........... 115/34 R
3,620,586  11/1971  Maastricht ..................... 308/207 A

*Primary Examiner*—George E. A. Halvosa
*Assistant Examiner*—Stuart M. Goldstein
*Attorney, Agent, or Firm*—Howson and Howson

[57] ABSTRACT

A system is disclosed for mounting a bearing assembly in the stern-post of ships in order to minimize wear between the outer ring of the bearing assembly and a bearing seat and where the inner ring is mounted on a propeller shaft. The system comprises two axially spaced pressure chambers interconnected by a conduit and adjacent opposite axial ends of the outer ring, a hydraulically operable piston in each of the chambers, a pump for pressurizing the chambers, and pressure valves in the conduit for limiting the fluid flow between the chambers and operable to permit fluid flow between the chambers-to balance the pressure in the chambers when the pressure in either chamber exceeds a predetermined level.

5 Claims, 1 Drawing Figure

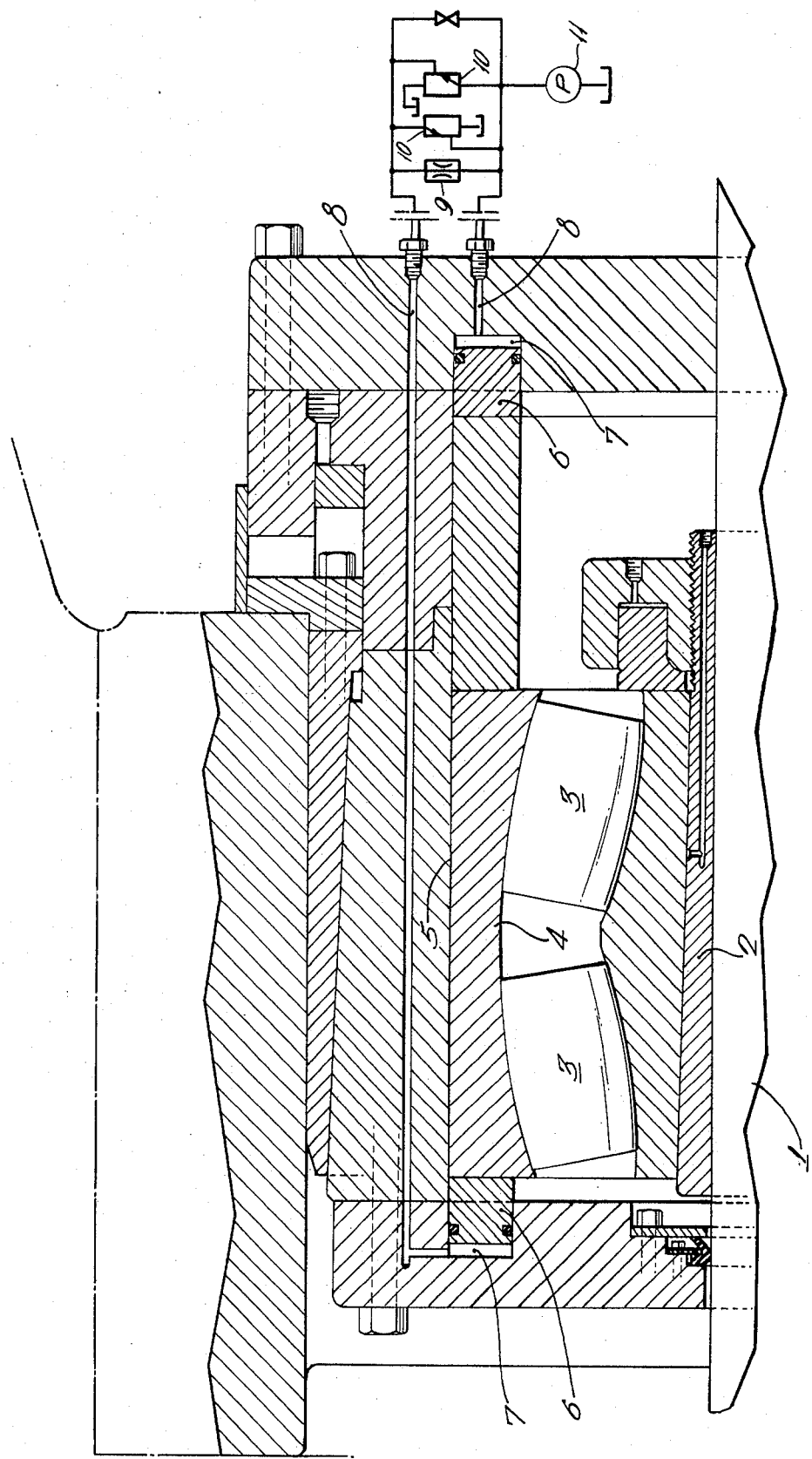

METHOD AND MEANS FOR PREVENTING WEAR BETWEEN OUTER RING AND BEARING SEAT OF ROLLER BEARING IN THE STERN-POST OF SHIPS

The present invention relates to the bearing of the propeller shaft in the stern-post of ships and relates more specifically to a method and a means for preventing wear between the outer ring of the rolling bearing and the bearing seat.

The propeller of a large ship is of an appreciable weight and a very big load is transferred from the propeller via the shaft to the ship. Most of the ships have for several reasons been equipped with plain bearings or other axially free-running bearings in the stern-post. Axial movements depending on forward or backwards pushing loads from the propeller can then occur unimpededly. Due to the heavy weight of the propeller one will, however, get large undesired edge stresses in the bearing. This is the reason why one has changed to self-aligning spherical rolling bearings.

The principle for mounting a rolling bearing in a stern-post appears from the FIGURE where the propeller shaft has been denoted with 1, the inner ring arranged on the propeller shaft with 2, the rolling bodies with 3 and the outer ring with 4. The outer ring is usually free-running and is secured in the bearing set 5 by means of friction forces. If, therefore, the outer ring is subjected to axial forces exceeding the friction force, it will move in the bearing seat and wear will occur.

When a propeller rotates, an uneven load on the propeller blades will occur, depending on in what position they actually are. A considerable change of the load of a propeller blade will especially occur when this passes the stern-post in its uppermost position. This load change is recognized as a shock pulse in the propeller shaft. The size of this pulse depends; for example, on the number of the propeller blades. Thus, a propeller having five blades make smaller shock pulses than those having six or four blades.

Besides said short, quick axial movements of the propeller shaft sometimes longer and usually slower movements of the shaft will arise, for example when the rotation direction of the propeller is altered.

In a spherical rolling bearing a certain play always exists providing displacement of the inner ring compared to the outer ring. Said short axial movements could, accordingly, take place in the bearing without influencing the outer ring if the movements did not exceed the play of the bearing. However, the friction coefficient between the outer ring and the bearing seat is usually 0.08 – 0.12, and the friction that then arises is exceeded by the axial force acting on the outer ring via the rolling bodies when the movements of the propeller shaft are of a certain size, usually 0.2 – 0.3 mm. This means that the outer ring will rub against the bearing seat.

If we presume that the propeller shaft has a number of revolutions of about 80 per minute and we have a propeller with five blades, then 400 shock pulses will arise each minute. It is accordingly evident that the rubbing deriving from these pulses will quickly wear down the outer ring. The longer, slower movements are so few that we may leave them disregarded in this connection.

According to the present invention one has obtained a method to prevent wear between the outer ring and the bearing seat of rolling bearings in the stern-post of ships, which method is characterized in that the outer ring is loaded on both sides so that quick, short axial movements of the propeller shaft are not transferred to any appreciable extent to the outer ring, while longer, slow movements are transferred and displace the outer ring.

A means to perform the method has also been made which means is loading both sides of the outer ring so that said influence on the movements can be obtained.

The means comprises hydraulic plungers on each side of the outer ring. These may be ring-shaped and arranged one on each side, but a plurality of such plungers may also be used.

To make the hydraulic plungers work according to the invention these are solenoid-controlled. The hydraulic plungers are pre-loaded and are balancing each other when standing quiet but as soon as a quick axial movement arises, a counter-pressure is built up preventing the axial movement of the outer ring.

On the figure, the hydraulic plungers are denoted with 6. These are influenced by oil in the chambers 7 getting their oil from the channels 8. To control the oil pressure a reducing valve has been arranged, through which oil flows only very slowly, which means that quick movements of the plungers 6 are prevented. When slow movements of the outer ring 4 occurs, the oil gets time enough to flow through the valve and a balancing of the pressure 6 arises. If, however, a longer movement should occur quickly (and, accordingly, be prevented in the valve 9) then pressure valves 10 have been arranged so that a not permitted rise in the system is avoided. When the valve pressure has been obtained, the large movement will occur without further resistance and the reducing valve will later bring about an equalizing of the pressure difference between the plungers. A pump 11 makes the pressure in the hydraulic system and replaces loss of oil.

In a special case, when the plungers were pre-loaded to a pressure of 40 atm. the axial movements of the outer ring in the bearing seat were reduced to about ± 0.006 mm due to the pressure reduction and the elasticity of the system. This movement is completely undangerous and should be compared with a movement of ± 0.3 mm, which would occur in this case without the means described.

The invention has further advantages. One case is, for instance, if the inner ring of a spherical roller bearing is obliquely mounted on the shaft, which never can be completely avoided. The oblique mounting of the inner ring will then give rise to an axial movement of the shaft that overlaps the oscillating movements mentioned above. According to the invention the movement will be transferred to the raceway of the outer ring. By permitting greater obliqueness of the inner ring the mounting work will be simplified.

When a spherical rolling bearing is subjected to a combined axial and radial load, one part of the axial load will elastically bend out a free-running outer ring axially, as it is loaded at its lower part and secured to the support by means of friction forces, while the upper part is unloaded and accordingly easier to move. This bending will also be reduced as a result of the arrangement according to the present invention. The outer ring is namely secured symmetrically around all of its periphery and any substantial bending will not occur.

The invention is not limited to the embodiment examples but can be modified in different ways within the scope of the claims. Thus, it can be possible to have an electronic control of the hydraulic plungers.

1. A system for mounting a bearing assembly in the stern-post of ships to minimize wear between the outer ring of the bearing assembly and a bearing seat and wherein the inner ring is mounted on a propeller shaft comprising means defining at least two axially spaced pressure chambers adjacent opposite axial ends of said outer ring, hydraulically operable piston means in each of said chambers, means for pressurizing said chambers, means in said conduit means limiting fluid flow between said chambers and operable to permit fluid flow between said chambers to balance the pressure in said chambers when the pressure in either chamber exceeds a predetermined level.

2. A system according to claim 1, characterized in that the means for loading of the outer ring comprises hydraulic plungers.

3. A system according to claim 1, characterized in that the hydraulic plungers are ring-shaped and arranged one on each side of the outer ring.

4. A system according to claim 1, characterized in that a plurality of separate hydraulic plungers are arranged on each side of the outer ring.

5. A system according to claim 1, characterized in that the hydraulic plungers are solenoid-controlled.

* * * * *

UNITED STATES PATENT OFFICE
CERTIFICATE OF CORRECTION

Patent No. 3,861,344                    Dated January 21, 1975

Inventor(s) Folke Gunnar Bergling

It is certified that error appears in the above-identified patent and that said Letters Patent are hereby corrected as shown below:

Column 3, line 11; insert before "means" -- flow conduit means interconnecting said chambers, --

Column 4, lines 5, 8 and 11; change the numeral "1" to -- 2 --

Signed and sealed this 1st day of July 1975.

(SEAL)
Attest:

RUTH C. MASON
Attesting Officer

C. MARSHALL DANN
Commissioner of Patents
and Trademarks